April 21, 1942.  C. W. MOTT  2,280,341
FLUID EXPANSIBLE DEVICE
Filed March 26, 1940

INVENTOR
C. W. MOTT
BY Paul O. Pippel
ATTY.

Patented Apr. 21, 1942

2,280,341

UNITED STATES PATENT OFFICE 2,280,341

FLUID EXPANSIBLE DEVICE

Carl W. Mott, La Grange, Ill., assignor to International Harvester Company, a corporation of New Jersey Application March 26, 1940, Serial No. 326,057

5 Claims. (Cl. 121—38)

This invention relates to fluid expansible devices, and more particularly to fluid expansible devices of the single-acting type and the handling of fluid within the same to prevent leakage from the device.

In a single-acting type of fluid expansible device, means must be provided to prevent leakage of fluid from the device, which may have passed the piston structure from the working side thereof, from being forced out of the device along the piston rod opening in one end thereof and at the same time provide means which will permit the influx of air to the nonworking side of the device when the piston structure is returned to the working side of the device. In other words, the fluid device must be permitted to breath in order to insure its satisfactory operation and at the same time means must be provided to prevent leakage of fluid from the device.

It is, therefore, the object of the present invention to provide a breather opening with an automatic sealing means for closing the same during the last part of the working stroke of the device to prevent the forcing of fluid out of the device.

It is also another object of the invention to provide a more efficient and fluid-tight expansible device whereby leakage of fluid from the same is prevented.

According to the present invention, there has been provided a sealing means adapted to be carried by the piston rod forming a part of the piston structure, which will automatically seal the opening through which the piston rod is adapted to slide; this same opening serving as the breather opening for the device. This sealing means definitely closes the opening as the piston structure approaches the piston rod end of the cylinder structure and prior to a time when sufficient pressure may have been built up to force the fluid along the piston rod and out of the device. The sealing element forming a part of the sealing means is frictionally retained along the piston rod and is adapted to be held against the wall of a recess in a head member by a compression spring as the piston structure nears the end of its stroke. This sealing element is carried by the piston rod and will move with it as the piston structure returns to the working side of the device thereby to unseal and permit the influx of air through the opening. This allows free movement of the piston structure, because no vacuum is allowed to be created within the piston rod end of the device. The piston structure includes means for collecting fluid which may have passed by the same for return to the working side of the device. Such a structure is described and claimed in the present inventor's Patent No. 2,194,209, patented March 19, 1940. The present device is an improvement on the device covered in this patent.

For a better understanding of the invention reference may be had to the following detailed description taken in connection with the accompanying drawing, in which.

Figure 1:
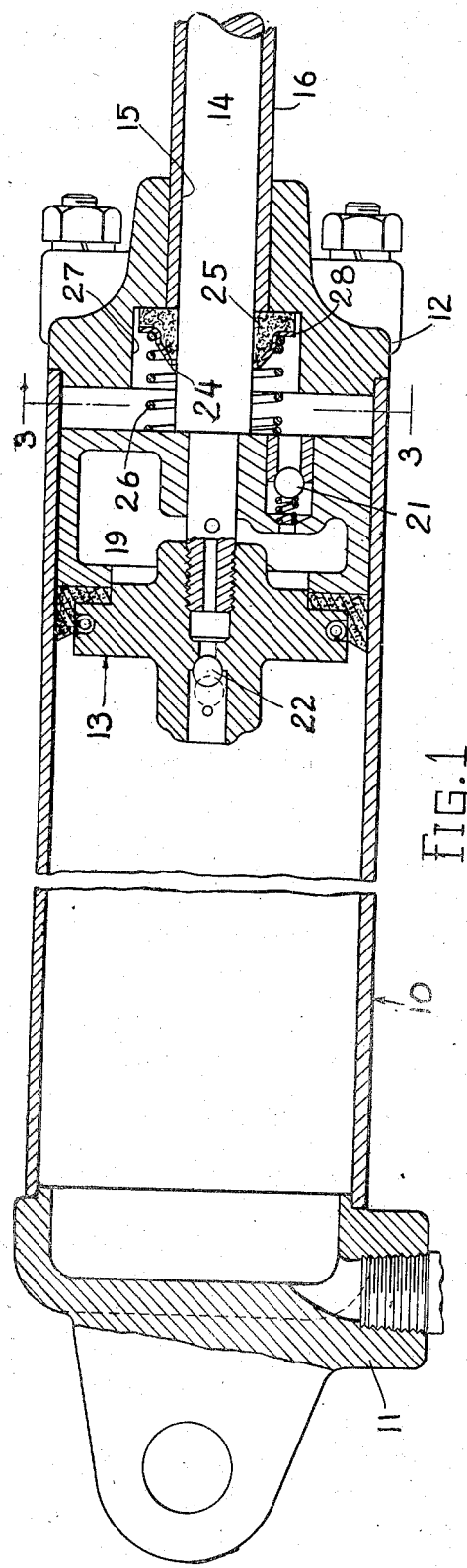
Figure 1 is a cross-sectional view in elevation of the fluid device incorporating the breather sealing means of the present invention.
Figure 2:
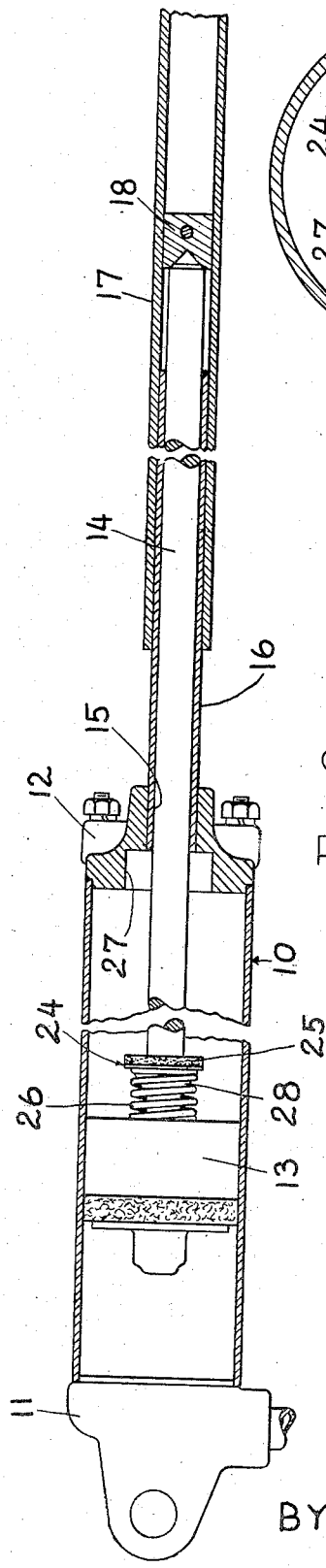
Figure 2 is a similar view of Figure 1, but of less size and showing in addition the connection of the piston rod element with means adapted to be moved; and, Figure 3 is a view in section taken along the line 3—3 of Figure 1.
Figure 3:
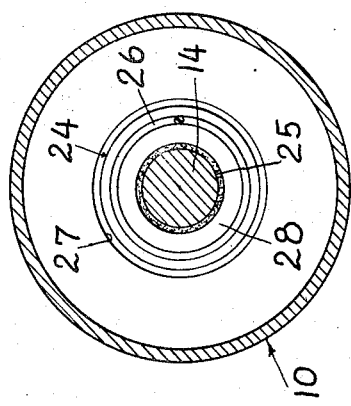

Referring now to the figures, there is shown an enclosing cylinder structure 10 having head members 11 and 12. The head member 11 has an opening through which working fluid may pass to the device to perform work upon the piston structure indicated generally at 13. This piston or working structure 13 includes a piston rod 14 adapted to slide through a breather opening 15 in the head member 12. Rigid with the head member 12 is a pipe sleeve 16 which forms the opening for the piston rod 14. This pipe sleeve 16 provides means for the connection of the cylinder device to a movable means 17, Figure 2, to which farm implements directly carried by a tractor can be operated or lifted to their transport position. For a clearer understanding of how the connection of the movable means 17 may be made with the implements, reference may be had to the Patent No. 2,213,401 of A. C. Lindgren and C. W. Mott, patented September 3, 1940. The piston rod 14 upon passing through the sleeve 16 seats against an abutment 18 forming a part of the movable means 17.

The piston structure 13 covered in the first-mentioned patent to the present inventor is of a type including a compression chamber 19 into which fluid, which may have collected in the piston rod end of the cylinder structure, will be forced by a valve 21, as the piston structure is being worked upon by fluid entering the cylinder structure, through the head member 11. The compression chamber collects the fluid and when the working side of the piston structure is relieved of fluid pressure, the fluid so collected will be forced out of the chamber by the compressed air.

The valve 22 is normally held closed during the working stroke of the piston structure by the fluid pressure on the working side thereof.

Since the opening 15 provides a source of leakage which provides a passage through which fluid may be forced out of the device, there has been provided in accordance with the present invention, a sealing means indicated generally at 24 and comprising a washer-like sealing element 25 and a compression spring 26. The sealing element 25 is frictionally carried by and surrounds the piston rod 14. The sealing means 24 will thereby move with the piston rod as the same returns to the working side of the device and will also move with it on movement toward the nonworking side of the device until such time as the sealing element 25 engages with the bottom wall of a recess 27 within the head member 12. As the forward face of the sealing element 25 contacts the bottom wall of the recess, any fluid which may have been collected in the nonworking side of the device preparatory to being delivered to the compression chamber 19 of the piston structure 13 is thereby sealed against passage through the opening 15, along the piston rod 14. The element 25 may be of any well known sealing material and backed up by a metal washer element 28 against which the compression spring 26 may act.

The recess 27 within the head member 12 provides means for permitting the full stroke of the piston structure 13. As the compression spring is finally compressed, it will lie fully within the recess 27 to provide the desired pressure for the sealing of the sealing element 25 against the wall of the recess 27.

It should now be apparent that a satisfactory sealing means has been provided for preventing the escape of fluid through the piston rod opening of the device which will not in any way interfere with the breathing of the device through such opening as the piston structure returns to the working side of the device. That also, breathing air taken into the device may be readily exhausted prior to the time when fluid might be forced through the opening and that actual sealing takes place as the piston structure nears the end of its stroke.

While various changes may be made in the detail construction, it shall be understood that these changes shall be within the spirit and scope of the present invention as described by the appended claims.

What is claimed is:

1. In a single-acting fluid expansible device, an enclosing cylinder structure having an opening through one end thereof, a piston structure movable within said cylinder structure from one end to the other end thereof, said movable piston structure including a piston rod adapted to work through the opening in the end of the cylinder structure, said piston structure adapted to collect leakage fluid which may have passed the same during its working movement to the piston rod end of the cylinder structure, and means for automatically sealing off the leakage fluid in the piston rod end of the cylinder structure as the piston structure approaches that end of the cylinder structure to receive the fluid and thereby to prevent forcing of fluid out of the cylinder structure through the opening thereof, and said sealing-off means including a washer-like sealing element frictionally carried by the piston rod and biasing means for forcing the sealing element against the opening end of the cylinder structure upon the piston structure approaching that end thereof.

2. In a single-acting fluid expansible device, an enclosing cylinder structure including a head member having a breather opening therethrough and a recess in alinement with the opening, a piston structure within said cylinder structure, the one structure being movable with respect to the other structure, said piston structure including a piston rod adapted to slide through the breather opening and said recess within the head member, and breather sealing means carried by said piston rod for closing the breather opening and adapted to seat within said recess when the piston structure is within the breather opening end of the cylinder structure, said sealing means including a washer-like sealing element frictionally carried by the piston rod and a compression spring for forcing the face of the sealing element against the recessed wall of the head member as the piston structure and head member approach each other.

3. In a single-acting fluid expansible device, an enclosing cylinder structure including a head member having a breather opening therethrough and a recess in alignment with the opening, a piston structure within said cylinder structure, the one structure being movable with respect to the other structure, said piston structure including a piston rod adapted to slide through the breather opening and said recess within the head member, and breather sealing means carried by said piston rod for closing the breather opening and adapted to seat within said recess when the piston structure is within the breather opening end of the cylinder structure, and said breather sealing means including a washer-like sealing element frictionally carried by the piston rod and biasing means for forcing the sealing element against the opening end of the cylinder structure upon the piston structure approaching that end thereof.

4. In a single-acting fluid expansible device, an enclosing cylinder structure having a breather opening through one end thereof, a piston structure movable within the cylinder structure from one end to the other end thereof, said piston structure having a piston rod adapted to work through breather opening, and breather sealing means carried by the piston rod for automatically closing the breather opening as the piston structure approaches the breather end of the cylinder structure, said sealing means including a washer-like sealing element frictionally carried by the piston rod and biasing means for forcing the face of the sealing element against the opening end of the cylinder structure upon the piston structure approaching that end thereof.

5. In a fluid expansible device, an enclosing structure having an opening therethrough, a piston structure movable within the enclosing structure and including a part adapted to work through the opening in the enclosing structure, said piston structure being adapted to collect leakage fluid which may have passed the same during its working movement toward the opening, and means for automatically sealing off the leakage fluid within the opening part of the enclosing structure as the piston structure approaches the opening to thereby prevent the forcing of fluid through the opening, and said sealing off means including a sealing element frictionally carried by said piston part, and biasing means for forcing the sealing element against the enclosing structure and adjacent the opening therein upon the piston structure approaching the opening.

CARL W. MOTT.